United States Patent [19]

Pinnock et al.

[11] Patent Number: 5,418,361

[45] Date of Patent: May 23, 1995

[54] OPTICAL DISPLACEMENT SENSOR EMPLOYING REFLECTED LIGHT OF FOUR WAVELENGTHS TO DETERMINE DISPLACEMENT AND THE REFRACTIVE INDEX OF THE MEDIUM

[75] Inventors: Robert A. Pinnock; Stephen D. Hawker, both of Birmingham, England

[73] Assignee: Lucas Industries public limited company, West Midlands, England

[21] Appl. No.: 204,754

[22] Filed: Mar. 2, 1994

[30] Foreign Application Priority Data

Mar. 9, 1993 [GB] United Kingdom .................. 9304738

[51] Int. Cl.⁶ .......................... H01J 5/16; H01J 40/14
[52] U.S. Cl. ............................ 250/227.21; 250/227.23
[58] Field of Search .................... 250/227.18, 227.21, 250/227.23, 226; 385/12; 356/3, 4, 5

[56] References Cited

U.S. PATENT DOCUMENTS

| | | | |
|---|---|---|---|
| 4,778,988 | 10/1988 | Henderson | 250/226 |
| 4,798,951 | 1/1989 | Walker | 250/227 |
| 4,946,275 | 8/1990 | Bartholomew | 356/4 |
| 5,001,338 | 3/1991 | Boero | 250/227.21 |
| 5,017,772 | 5/1991 | Hafle | 250/227.21 |
| 5,068,527 | 11/1991 | Iwamoto et al. | 250/227.21 |
| 5,164,600 | 11/1992 | Das et al. | 250/554 |

Primary Examiner—David C. Nelms
Assistant Examiner—Steven L. Nichols
Attorney, Agent, or Firm—Trexler, Bushnell, Giangiorgi & Blackstone, Ltd.

[57] ABSTRACT

An optical displacement sensor suitable for use in drowned environments where the refractive index of a medium in the optical path may vary, comprises a light source emitting first to fourth wavelengths. The first and second wavelengths are within the infrared region of the spectrum, whereas the third and fourth wavelengths are in the visible region of the spectrum. A zone plate focuses the first and second wavelengths to respective positions substantially at the extremes of movement of a reflective element whose position is to be measured. The zone plate also focuses the third and fourth wavelengths to respective positions. A cold mirror is interposed between the zone plate and the reflective element and is arranged to transmit the first and second wavelengths and to reflect the third and fourth wavelengths. The ratio of the intensities of the light reflected from the cold mirror gives information about the refractive index of the medium in the optical path. This information can be used to correct the measurement of the position of the reflective element which is determined by the ratio of reflected intensities of the first and second wavelengths.

10 Claims, 1 Drawing Sheet

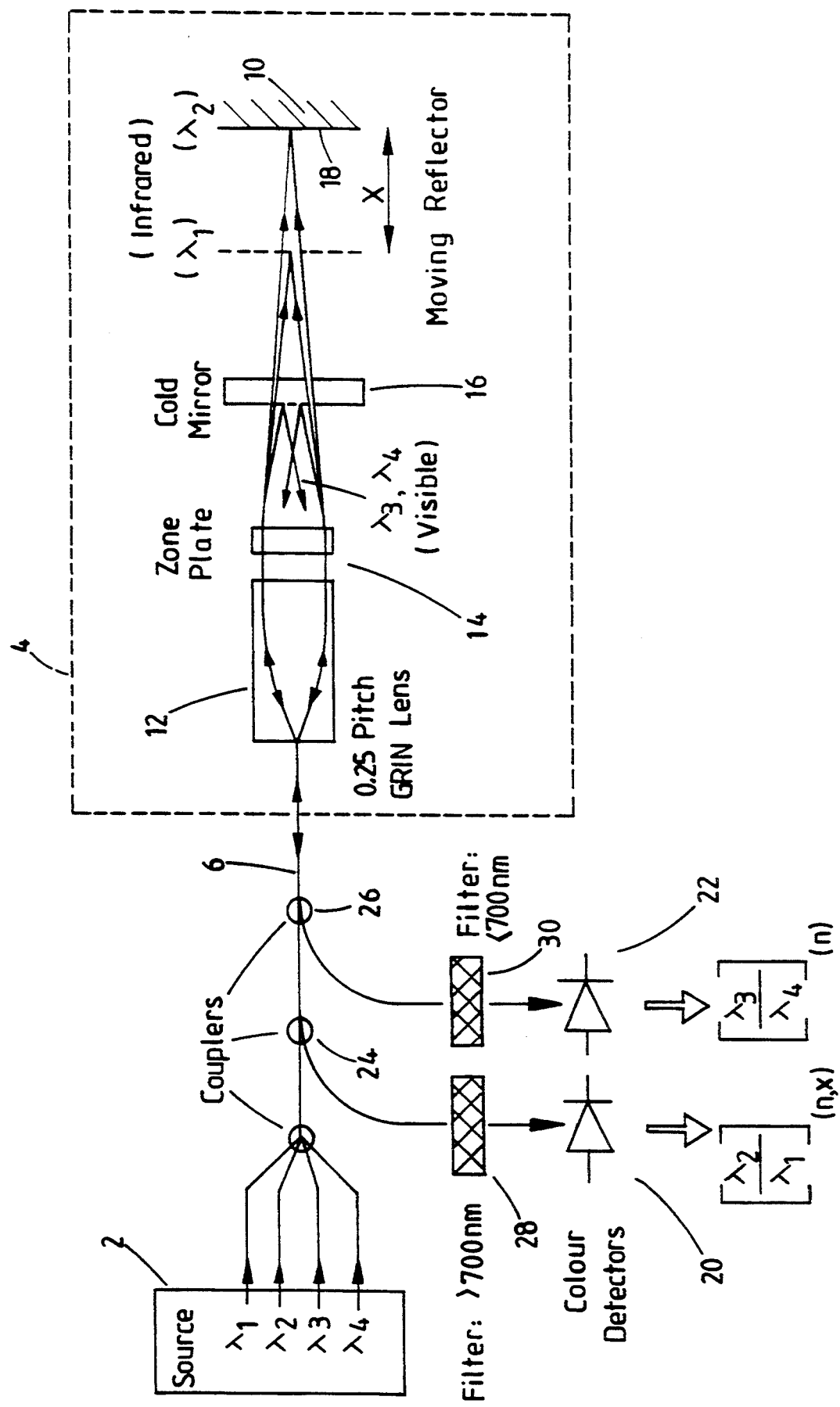

OPTICAL DISPLACEMENT SENSOR EMPLOYING REFLECTED LIGHT OF FOUR WAVELENGTHS TO DETERMINE DISPLACEMENT AND THE REFRACTIVE INDEX OF THE MEDIUM

The present invention relates to an optical displacement sensor. Such a sensor may be used in environments where the refractive index of a transmissive medium in the optical path may be subject to variation or where the quality of the optical path may vary or be degraded.

GB 2188143A discloses a position sensor in which white light from an optical fibre is focused onto a movable holographic zone plate. Monochromatic light reflected from the zone plate is collected by a second optical fibre and conveyed to a wavelength analyzer.

U.S. Pat. No. 4,798,951 discloses a position sensor in which first and second wavelengths of light are directed at an axially movable element. The element carries a filter having first and second surfaces separated by a distance t in the direction of movement of the element. The first surface reflects light of the first wavelength and the second surface reflects light of the second wavelength. The value of $I1(I2-I1)$ varies as a linear function of displacement of the element, where $I1$ and $I2$ are the intensities of the reflected light of the first and second wavelengths, respectively.

DE 3604038A also discloses an arrangement in which light of two dissimilar wavelengths is focused by an imaging system having different focal length for each wavelength. The intensities of the wavelengths after reflection from a movable element are compared to determine the distance to the element.

Known optical displacement sensors relying on radiation being reflected from a surface are adversely affected by changes in the refractive index of the medium surrounding the sensor.

According to the present invention there is provided an optical displacement sensor for measuring displacement of a reflective element which is movable between first and second positions, comprising:

means for providing first radiation of a first wavelength, second radiation of a second wavelength, third radiation of a third wavelength, and fourth radiation of a fourth wavelength;

focusing means having a focal length which is a function of wavelength for focusing the first radiation at substantially the first position, the second radiation at substantially the second position, the third radiation at a third position and the fourth radiation at a fourth position;

a reflective surface for reflecting the third and fourth radiations; and photosensing means arranged to measure the relative intensities of the first and second radiations reflected from the reflective element and the relative intensities of the third and fourth radiations reflected from the reflective surface.

The use of radiation at four wavelengths allows changes in focal length of the optical system, for instance as a result of changes in the refractive index of a medium in the optical path, to be compensated. Such changes in refractive index may result from variations in temperature, composition and/or pressure of a fluid within the optical path. Additionally compensation for simultaneous intensity variations can also be provided.

Preferably the photosensing means comprises a first photodetector arranged to measure the relative intensities of the first and second radiations and a second photodetector arranged to measure the relative intensities of the third and fourth radiations.

Preferably the reflective surface is a selectively reflective surface arranged to reflect radiation having a first range of wavelengths and to transmit radiation having a second range of wavelengths. Preferably the selectively reflective surface is interposed between the focusing means and the first and second positions and is arranged to transmit the first and second radiations and to reflect the third and fourth radiations.

Preferably the selectively reflective surface is arranged to transmit radiation having a wavelength longer than a first predetermined value and to reflect radiation having a wavelength shorter than a second predetermined value. The first and second predetermined values may be substantially equal.

Preferably the third and fourth positions are at or adjacent the selectively reflective surface. Preferably the position of the selectively reflective surface and the third and fourth radiations are selected such that, for a predetermined range of values of refractive index for a medium in the optical path, the third radiation is focused at or near the selectively reflective surface at one extreme value of the refractive index, and the fourth radiation is focused at or near the selectively reflective surface at the other extreme value of the refractive index.

The first to fourth radiations may be any of visible, infra-red or ultraviolet radiations. In an embodiment of the present invention, the first and second radiations are infra-red radiations, for instance having wavelengths of greater than 700 nm, and the third and fourth radiations have wavelengths of less than 700 nm.

The selectively reflective surface acts as a reference reflector for the third and fourth radiations. Changes in the relative intensities of the light received at the second photodetector are caused by changes in the refractive index of the medium in the optical path. This data can be used to compensate the output of the first photodetector so as to provide an optical displacement sensor substantially immune to changes in refractive index.

Preferably the source of radiation is a broad band light source. Advantageously the radiation is carried along a waveguide, such as a fibre optic waveguide, to the focusing means.

Preferably radiation reflected from the element and from the selectively reflective surface is carried by a waveguide towards the photosensing means. Advantageously the waveguide carrying light to the focusing means is also employed to carry the reflected radiation towards the photosensing means.

Preferably the focusing means comprises a zone plate. Advantageously the focusing means further comprises a lens, such as a graded index lens, for coupling the radiation from and to the optical fibre. The lens advantageously provides a substantially collimated beam of radiation from the radiation means. The zone plate may be interposed between the lens and the selectively reflective surface.

It is thus possible to provide an optical displacement sensor which permits compensation for changes in the refractive index of a medium in the optical path, and compensation for optical intensity variations caused by, for example, optical source degradation or degradation of the waveguide.

The present invention will further be described, by way of example, with reference to the accompanying drawing.

BRIEF DESCRIPTION OF THE DRAWING

The sole drawing is a schematic diagram of an optical displacement sensor constituting an embodiment of the present invention.

A light source 2 is connected to a sensor head, indicated generally as 4, via an optical fibre 6. In this context the term "light" includes not only visible radiation, but also infra-red and ultra-violet radiation. The sensor head, which may be disposed within a fluid filled actuator for measuring the displacement of an output element 10 thereof between first and second positions, has an optical path comprising a graded index lens 12, a zone plate 14, a cold mirror 16 and a reflecting surface 18 of the element 10.

Light returning from the sensor head 4 is directed towards first and second sensors 20 and 22, via first and second fibre optic couplers 24 and 26 and first and second filters 28 and 30, respectively. One of the sensors may be a colour sensor type PD 150 and the other may be a colour sensor type PD151, both of which are available from Sharp.

The light source 2 provides four different wavelengths $\lambda 1$, $\lambda 2$, $\lambda 3$ and $\lambda 4$ of light. $\lambda 1$ and $\lambda 2$ lie within the infra red part of the spectrum, while $\lambda 3$ and $\lambda 4$ lie within the visible part of the spectrum. The light is conveyed to the sensor head 4 via the fibre optic cable 6. The graded index lens 12 receives the light from the cable 6 and forms it into a substantially collimated beam which is directed towards the zone plate 14. The zone plate 14 acts as a converging lens having a focal length inversely proportional to the wavelength $\lambda$ of the light. The wavelengths $\lambda 1$ and $\lambda 2$ are selected such that the zone plate focuses the light having the wavelength $\lambda 1$ to a point substantially coincident with the first position of the element 10 and the light having the wavelength $\lambda 2$ to a point substantially coincident with the second position of the element 10.

The position of the cold mirror 16 and the wavelengths $\lambda 3$ and $\lambda 4$ are selected such that, for a normal range of values of refractive index for the medium in the optical path, light of wavelength $\lambda 3$ is focused at or near the cold mirror 16 at one extreme value of the refractive index, and light of wavelength $\lambda 4$ is focused at or near the cold mirror 16 at the other extreme value of the refractive index.

The cold mirror is arranged to reflect visible light and to transmit infrared light. Thus, light of wavelengths $\lambda 1$ and $\lambda 2$ is transmitted towards and then reflected back from the surface 18 whereas light of wavelengths $\lambda 3$ and $\lambda 4$ is reflected from the cold mirror 16.

Movement of the element 10 between the first and second positions causes the relative intensities of the light at the different wavelengths reflected therefrom to alter. When the element 10 is in the position illustrated in the drawing, a bright spot of light having a wavelength $\lambda 2$ is formed at and subsequently reflected from the surface 18. Light of wavelength $\lambda 1$ is not focused at the surface and therefore impinges on the surface over a relatively large area. Thus, relatively little light of wavelength $\lambda 1$ is reflected back into the fibre optic cable 6. Consequently the ratio $\lambda 2/\lambda 1$ of the intensities, as measured by the sensor 20, takes a relatively large value, indicating the element to be at or near the second position. The sensor 20 may provide an output representing a different function of the wavelengths, for instance a different ratio such as $(\lambda 2 - \lambda 1)/(\lambda 2 + \lambda 1)$.

As the element 10 moves towards the first position, the light of wavelength $\lambda 1$ becomes progressively better focused into a smaller and brighter spot, whereas the light of wavelength $\lambda 2$ becomes progressively defocused into a larger spot. In so doing, the ratio $\lambda 2/\lambda 1$ of the intensities takes a progressively decreasing value.

The focal length of the zone plate is a function not only of wavelength but also of the refractive index of the medium surrounding it. In the case of a liquid filled actuator, in which the optical components are immersed in liquid, the refractive index of the liquid may vary with changing composition and/or temperature. Such variations in refractive index can give rise to false readings of the position of the element 10. The cold mirror 16 is provided in order to provide data to compensate for changes in refractive index. The cold mirror 16 effectively forms a fixed reference reflector for the visible light. Changes in refractive index of the liquid in the optical path alters the degree of focusing of the visible light at wavelengths $\lambda 3$ and $\lambda 4$ on to the mirror 16. Thus, the ratio of intensities $\lambda 3/\lambda 4$, as measured by the sensor 22, provides data as to the refractive index of the liquid in the optical path. The refractive index information can then be used to correct the positional information. The ratiometric nature of the measurement renders it substantially insensitive to changes in the transmissivity of the liquid. As in the case of the sensor 20, the sensor 22 may provide an output representing a different function of wavelengths.

The light reflected from the cold mirror 16 and from the surface 18 is coupled back into the fibre 6 by the lens 12. Directional couplers 24 and 26 recover the reflected light from the optical fibre 6 and direct the reflected light towards the sensors 20 and 22. Filters 28 and 30 are provided in association with the sensors. The filter 28 transmits light with a wavelength longer than 700 nm, i.e. Infra-red, and blocks visible light. Thus the sensor 20 is substantially only responsive to light reflected from the surface 18. The filter 30 transmits visible light but blocks infra-red, thus the sensor 22 is substantially only sensitive to light reflected from the cold mirror 16.

The positional information, as conveyed by the ratio of intensities of light having wavelengths $\lambda 2$ and $\lambda 1$, and the refractive index information, as conveyed by the ratio of intensities of light having wavelengths $\lambda 3$ and $\lambda 4$, are effectively frequency multiplexed in the fibre optic system. This allows most of the optical path to be constituted by a single optical fibre, so that any variation or degradation of the optical path affects the four "channels" substantially identically. Thus, the need to "equalise" the channels is reduced or eliminated.

It thus possible to provide a displacement sensor for use in an environment, such as a liquid filled or "drowned" environment, where the refractive index of a transmissive medium in the optical path is subject to variation. The sensor can measure the refractive index of the medium and this data can be used to correct the measurement of displacement. Thus high accuracy over a wide range of operating conditions can be obtained.

We claim:

1. An optical displacement sensor for measuring displacement of a reflective element which is movable between first and second positions, said optical displacement sensor comprising: a radiation source for providing first radiation of a first wavelength, second radiation of a second wavelength, third radiation of a third wavelength, and fourth radiation of a fourth wavelength; focusing means having a focal length which is a function of wavelength for focusing said first radiation substantially at said first position, said second radiation substantially at said second position, said third radiation at a third position and said fourth radiation at a fourth position; a reflective surface for reflecting said third and fourth radiations; and photosensing means arranged to measure relative intensities of said first and second radiations reflected from said reflective element and relative intensities of said third and fourth radiations reflected from said reflective surface.

2. An optical displacement sensor as claimed in claim 1, in which said photosensing means comprises first and second photodetectors, said first photodetector being arranged to measure said relative intensities of said first and second radiations, and said second photodetector being arranged to measure said relative intensities of said third and fourth radiations.

3. An optical displacement sensor as claimed in claim 1, in which said reflective surface is a selectively reflective surface arranged to transmit radiation within a first range of wavelengths and to reflect radiation within a second range of wavelengths.

4. An optical displacement sensor as claimed in claim 3, in which said reflective surface is interposed between said focusing means and said first and second positions, said reflective surface being arranged to transmit said first and second radiations and to reflect said third and fourth radiations.

5. An optical displacement sensor as claimed in claim 3, in which said third and fourth radiations and a position of said reflective surface are selected such that, for a predetermined range of values of refractive index of a medium in an optical path, said third radiation is focused substantially at said reflective surface at a first extreme value of refractive index, and said fourth radiation is focused substantially at said reflective surface at second extreme value of refractive index.

6. An optical displacement sensor as claimed in claim 1, in which said first and second radiations have wavelengths greater than 700 nm, and said third and fourth radiations have wavelengths of less than 700 nm.

7. An optical displacement sensor as claimed in claim 1, further comprising a waveguide for carrying radiation from said radiation source to said focusing means.

8. An optical displacement sensor as claimed in claim 1, further comprising a waveguide for carrying radiation reflected from said reflective element and from said reflective surface to said photosensing means.

9. An optical displacement sensor as claimed in claim 1, in which said focusing means comprises a zone plate.

10. An optical displacement sensor as claimed in claim 9, further comprising an optical fibre and a lens, said optical fibre being arranged to carry radiation from said radiation source to said focusing means, and to carry radiation reflected from said reflective element and said reflective surface to said photosensing means, said lens being arranged to couple radiation to and from said optical fibre.

* * * * *